United States Patent [19]

Yoshimura

[11] Patent Number: 4,953,036
[45] Date of Patent: Aug. 28, 1990

[54] DIGITAL COPIER HAVING SWITCHABLE PIXEL DENSITIES

[75] Inventor: Tsuyoshi Yoshimura, Tokyo, Japan

[73] Assignee: Ricoh Company, Ltd., Tokyo, Japan

[21] Appl. No.: 324,008

[22] Filed: Mar. 16, 1989

[30] Foreign Application Priority Data

Mar. 25, 1988 [JP] Japan ................................ 63-71011

[51] Int. Cl.⁵ .............................................. H04N 1/00
[52] U.S. Cl. ..................................... 358/400; 358/472
[58] Field of Search ............... 358/256, 285, 400, 401, 358/471, 472, 474, 493, 494

[56] References Cited

U.S. PATENT DOCUMENTS

| | | | |
|---|---|---|---|
| 4,268,868 | 5/1981 | Yokota | 358/285 |
| 4,390,903 | 6/1983 | Pomeroy | 358/285 |
| 4,423,426 | 12/1983 | Kitamura | 358/285 |
| 4,580,172 | 4/1986 | Rajagopal | 358/285 |
| 4,660,094 | 4/1987 | Yoshimoto | 358/285 |
| 4,680,642 | 7/1987 | Shimano et al. | 358/462 |
| 4,711,553 | 12/1987 | Watanabe | 358/75 |
| 4,719,515 | 1/1988 | Miyagawa | 358/285 |
| 4,771,337 | 9/1988 | Endo | 358/285 |

*Primary Examiner*—Edward L. Coles, Sr.
*Assistant Examiner*—Jerome Grant, II
*Attorney, Agent, or Firm*—Oblon, Spivak, McClelland, Maier & Neustadt

[57] ABSTRACT

A digital copier capable of switching the pixel density of an image to be printed out. A laser printer installed in a writing section of the copier is also usable for printing out image data fed from another machine which may be operatively connected to the copier. A switching device is provided for switching the pixel density of an image to be printed out over to one of a plurality of pixel densities which matches with the particular machine connected to the copier. The switching device selects either one of at least two lenses included in illuminating optics of the laser printer and each having a different focal length, or selectively moves a single lens of the illuminating optics to any of a plurality of stop positions which are defined on an optical axis of the optics, or selectively changes the illumination time of a laser beam of the laser printer, or selectively changes the rotation speed of a mirror motor adapted to drive a polygonal mirror of the laser printer.

5 Claims, 6 Drawing Sheets

DIGITAL COPIER HAVING SWITCHABLE PIXEL DENSITIES

BACKGROUND OF THE INVENTION

The present invention relates to a digital copier capable of printing out an image with switchable pixel densities.

Generally, a digital copier has a reading section for reading an image to be copied and a writing section for writing the read image on a photoconductive element or similar image carrier. The writing section is often implemented by a laser printer. A current trend in the art is therefore toward the use of the writing section of such a digital copier as a printer of another machine such as a word processor or a facsimile apparatus and, in fact, many of modern digital copiers are so designed. A word processor, facsimile apparatus or similar machine produces outputs chiefly in the form of characters, as distinguished from pictures, and therefore does not need extremely high pixel density in printing. For this reason, a majority of printers currently used with this kind of machine has a pixel density of 240 dots per inch or 300 dots per inch, for example. The pixel density of a picture available with such a machine is also low. For example, a digital signal applicable to a word processor to print out characters has a pixel density which is as low as 24×24 dots, and therefore the pixel density of picture data available is also low. On the other hand, a digital copier needs and is usually provided with a pixel density of higher than 400 dots per inch so that it may print out images as faithfully as an analog copier. Assume that a character outputted by a word processor having a pixel density of 240 dots per inch, for example, is printed out by a printer which is installed in a writing section of a digital copier whose pixel density is 400 dots per inch. Then, the number of pixels per inch in the image signal from the word processor is 240 with respect to the main scanning line. However, since the number of pixels available with the printer is 400 per inch, the image is reduced to 240/400 when printed out. To compensate for such a reduction, a polygonal mirror forming a part of optics which is disposed in the writing section may have its rotation speed reduced to 240/400. Although this kind of implementation may guarantee 1:1 magnification, adjacent pixels will be spaced apart from each other in both of the main and subscanning directions because each pixel has a small diameter associated with the pixel density of 400 dots per inch, resulting in low image quality.

SUMMARY OF THE INVENTION

It is therefore an object of the present invention to provide a digital copier in which a printer provided in a writing section is usable as a printer of another machine as desired.

It is another object of the present invention to provide a digital copier which allows the pixel density to be switched by a simple manipulation and adapts itself to image data outputted by another kind of machine.

It is another object of the present invention to provide a generally improved digital copier.

A digital copier capable of printing out image data which are outputted by another machine connected to the copier of the present invention comprises a reading section for optically reading a document to be copied and outputting the read document in the form of image data, an inputting section for receiving image data which are fed from the another machine, the writing section comprising a light source, illuminating optics for causing light to substantially converge on an optical axis of the light source, a rotatable polygonal mirror located downstream of an optical path of the illuminating optics, reflecting optics for converging in the form of a beam spot the light which is reflected by the polygonal mirror for scanning, and an imaging surface on which the light spot is scanned relative to the imaging surface and focused in the form of a pixel, and a switching device installed in the writing section for switching a pixel density to one of a plurality of pixel densities which matches with the another machine.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

Figure 1:
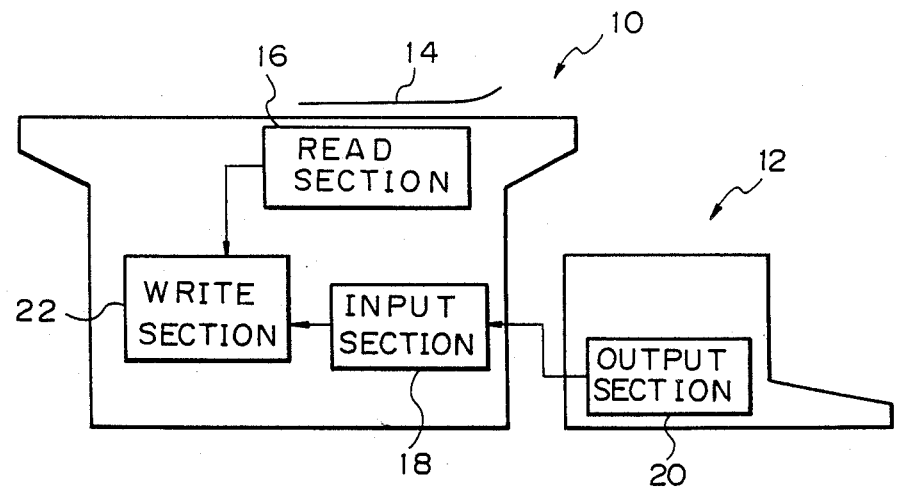
FIG. 1 is a schematic diagram showing a prior art digital copier.
Figure 2:
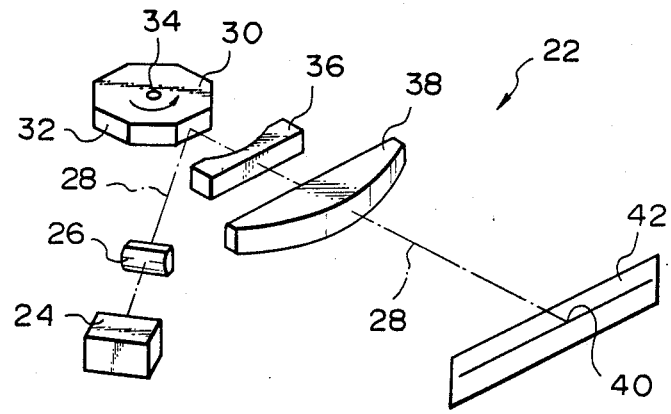
FIG. 2 is a perspective view showing the construction of a writing section which is included in the copier of FIG. 1.

To better understand the present invention, a brief reference will be made to a prior art digital copier, shown in FIGS. 1 and 2. In FIG. 1, a prior art digital copier 10 is shown as being operatively connected to a word processor 12 by way of example. The copier 10 has thereinside a reading section 16 for reading a document 14 and an inputting section 18 which is connectable to an outputting section 20 of the word processor 12. The reading section 16 and inputting section 18 are switchably connected to a writing section 22. As shown in FIG. 2, the writing section 22 includes a light source in the form of a semiconductor laser 24 and a cylindrical lens 26 which is disposed on the optical axis of the laser 24 and constitutes illuminating optics. These members are formed and arranged such that a laser beam 28 substantially converge on a surface 32 of a polygonal mirror 30. Having a flat octagonal prism-like configuration, for example, the polygonal mirror 30 has a center shaft 34 directly connecting to a mirror motor (not shown) which serves as a drive source. Lenses 36 and 38 are located on the optical path along which the laser beam 28 is reflected from the polygon mirror 30, constituting reflecting optics. The reference numeral 42 designates a photoconductive surface of a photoconductive drum which may be implemented by a photoconductive semiconductor.

The writing section 22 is operable to select either one of the output of the reading section 16 for copying the document 14 and the output of the inputting section 18 for printing out characters or similar image data which are fed from the word processor 12. A problem with this kind of digital copier 10 is that the pixel density necessary for copying the document 14 (higher than 400 dots per inch inclusive of 400) and the pixel density necessary for printing out image data fed from the word processor 12 (240 dots per inch or 300 dots per inch) are different from each other, as discussed earlier. This lowers the image quality attainable with the copier 10, especially the printing quality of image data fed from the word processor 12.

Figure 3:
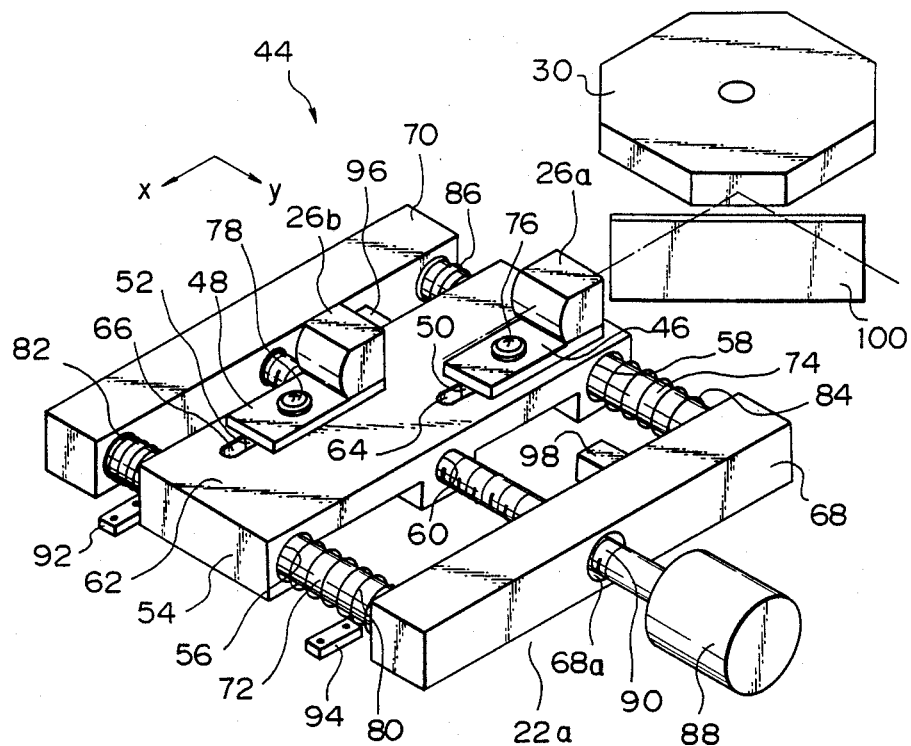
FIGS. 3 and 4 are fragmentary perspective views representative of a writing section which forms a part of a digital copier embodying the present invention.
Figure 4:
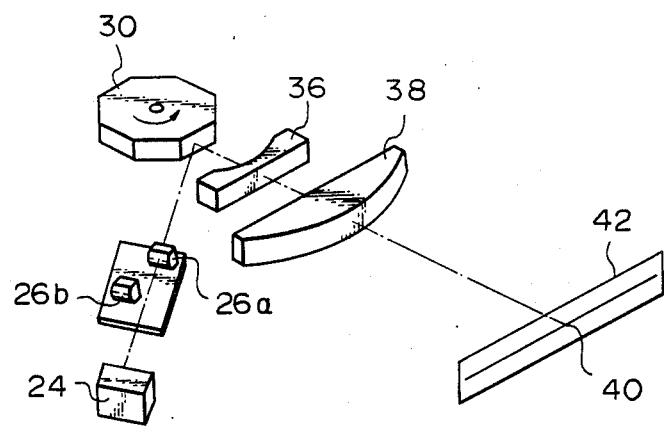

Referring to FIGS. 3 and 4, a digital copier embodying the present invention is shown. In the figures, the same or similar structural elements as those shown in FIGS. 1 and 2 are designated by like reference numerals, and details thereof will not be described to avoid redundancy.

In FIG. 3, a switching device 44 is shown which is installed in a writing section 22 that forms an essential part of the illustrative embodiment. Illuminating optics 25 is constituted by two cylindrical lenses 26a and 26b each having a different focal length. The cylindrical lenses 26a and 26b are respectively mounted on flat rectangular sliders 46 and 48 each being formed with a bolt hole (not shown). Pins 50 and 52 extend downward from the sliders 46 and 48, respectively. A holder 54 has a substantially rectangular parallelpiped configuration and is elongate in the direction of an optical axis x. The holder 54 is bored to have guide holes 56 and 58 and a spiral hole 60 which individually extend horizontally in a direction y that is perpendicular to the direction x. Slots 64 and 66 are formed through the upper surface 62 of the holder 54 and each is elongate in the direction x. Yokes 68 and 70 are disposed on the bottom 22a of the writing section 22 and spaced apart from each other by a predetermined distance, each of the yokes 68 and 70 being elongate in the direction x. Aligned motor holes 68a are formed through substantially the intermediate portions of the yokes 68 and 70 to extend in the direction y. Guides in the form of rods 72 and 74 extend between the yokes 68 and 70. In assembly, the sliders 46 and 48 are placed on the upper surface 62 of the holder 54 with their pins 50 and 52 being respectively inserted in the elongate slots 64 and 66, and then bolts 76 and 78 are driven into the bolt holes (not shown) and their associated slots 64 and 66. The sliders 64 and 66 and the holder 54 fastened together by the bolts 76 and 78 and nuts (not shown). In this condition the sliders 46 and 48 are substantially unitary with the holder 54 and, yet, adjustable in position in the direction x as needed. After the holder 54 has been laid on the bottom 22a of the writing section 22, the guides 72 and 74 are respectively inserted in the guide holes 56 and 58 with the intermediary of springs 80 and 82 and springs 84 and 86. A spiral rod 90 directly connected to a reversible motor 88 is loosely fitted in the motor hole 68a while being brought into threaded engagement with the spiral hole 60. Sensors 92 and 94 and stops 96 and 98 are located at desired positions of the bottom 22a and at opposite sides of the holder 54. A dust glass 100 is provided for isolating the polygonal mirror 30 from the outside.

In the above construction, the holder 54 is usually held in abutment against the stop 96 by the force of the springs 80, 82, 84 and 86 and a restraining force which is exerted by the rotation of the spiral rod 90. The position of the stop 96 is adjusted to maintain the cylindrical lens 26a in the same position as in the prior art digital copier 10 (FIG. 1), allowing copying operations to be executed in the conventional manner. To print out data by connecting the copier to the word processor 12, for example, the reversible motor 88 is operated by any desired manipulation. The motor 88 in turn rotates the spiral rod 90 until the holder 54 abuts against the stop 98. This brings the cylindrical lens 26b onto the optical path. Since the focal length of the cylindrical lens 26b is different from that of a cylindrical lens heretofore used, the beam waist is brought out of the photoconductive surface 42 resulting in the diameter of the beam spot 40 being increased. Consequently, pixels are increased in their vertical dimension. This allows the interpixel distance to be reduced in the subscanning direction, for example, and thereby uniformizes the pixel density.

Which of the two lenses 26a and 26b is located on the optical path is constantly determined by the sensors 92 and 94, and the reversible motor 88 is controlled in response to the outputs of the sensors 92 and 94. The springs 80, 82, 84 and 86 serve to free the holder 54 from a play despite the operations for switching the lenses 26a and 26b, etc.

When the area of the beam spot 40 is increased by shifting the beam waist from the photoconductive surface 42 as stated above, there is a fear that the quantity of light per unit area is reduced. In the light of this, when the pixel density is switched, use may be made of an ink toner having a different degree of adhesion and/or the intensity of light issuing from the light source may be changed in due consideration of the sensitivity of the photoconductive surface 42, for example.

Figure 5:
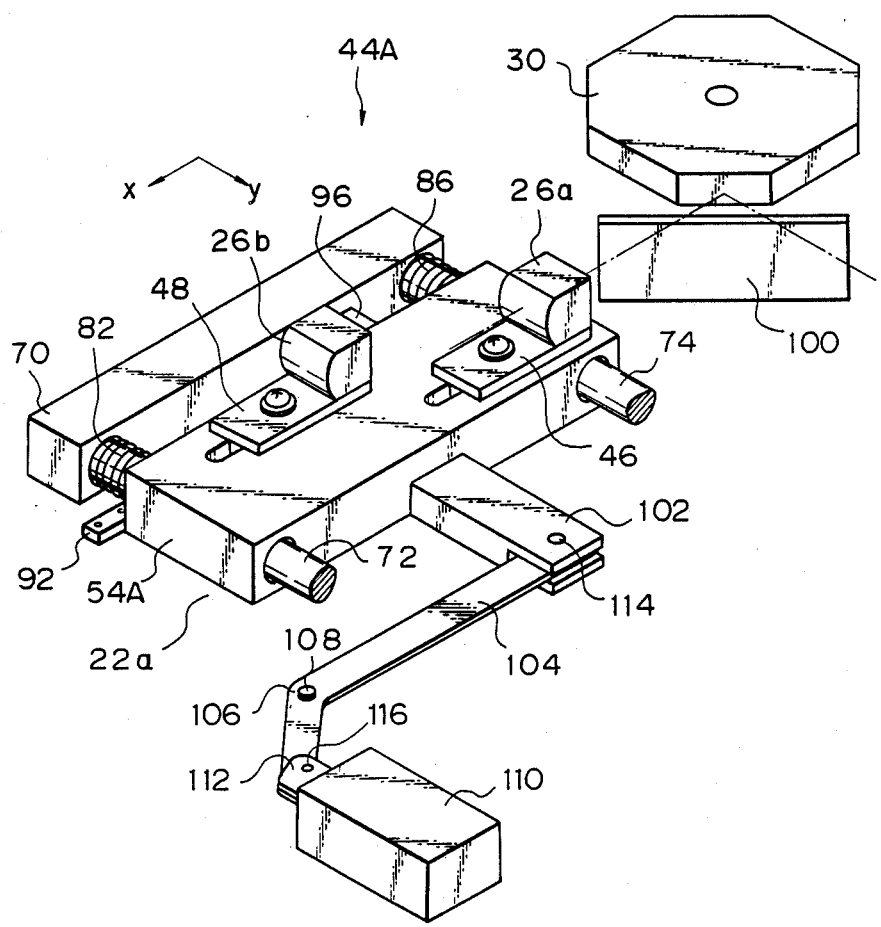
FIG. 5 is a fragmentary perspective view showing an alternative embodiment of the present invention.

Referring to FIG. 5, an alternative embodiment of the present invention is shown. In the figure, the same or similar structural elements as those shown in FIGS. 1 to 4 are designated by like reference numerals. As shown, a switching device 44A provided in the writing section of the digital copier has a holder 54A which is provided with a hand 102 that extends in the direction y. A bent elongate arm 104 is rotatably mounted at its bent portion 106 on a shaft 108 which extends from the bottom 22a of the writing section 22. A solenoid 110 having a plunger 112 is securely mounted on the bottom 22a. The arm 104 is connected at one end to the free end of the hand 102 by a pin 114 and at the other end to the free end of the plunger 112 by a pin 116. The hand 102, arm 104 and solenoid 110 are positioned substantially perpendicularly to each other so that they may operate as a crank mechanism. The other members included in this particular embodiment are the same as those of the first embodiment.

Figure 6:
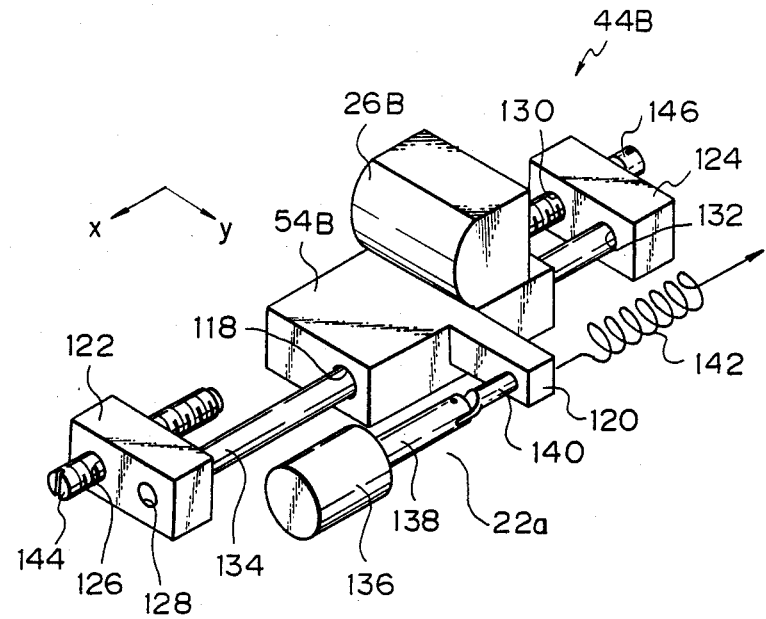
FIG. 6 is a fragmentary perspective view showing another alternative embodiment of the present invention.

In the construction shown in FIG. 5, the holder 54A is usually held in abutment against the stop 96 by the springs 82 and 86. The cylindrical lens 26a therefore assumes the same position as in the prior art copier 10 so as to effect copying operations as usual. When the copier is connected to the word processor 12, for example, the solenoid 110 is energized by any desired manipulation so that the plunger 112 of the solenoid 110 causes the arm 104 to rotate about the shaft 108. As a result, the hand 102 connected to the other end of the arm 104 is pulled to in turn shift the holder 54A away from the stop 96. This brings the cylindrical lens 26b onto the optical axis and thereby increases the vertical dimension of pixels, whereby the interpixel distance may be reduced in the subscanning direction, for example FIG. 6 shows still another alternative of the present invention. In the figure, the same or similar structural elements as those shown in FIGS. 1 to 5 are designated by like reference numerals. As shown, a switching device 44B installed in the writing section 22 has a holder 54B on which a cylindrical lens 26B is mounted. The lens 26B constitutes the illuminating optics. The holder 54B is formed with a guide hole 118 in the direction x and provided with a hand 120 which extends out in the direction y. Yokes 122 and 124 extend upright from the bottom 22a at opposite sides of the holder 54B. A threaded stop hole 126 and a guide hole 128 are formed through the yoke 122 to extend in the direction x. Likewise, a threaded stop hole 130 and a guide hole 132 are formed through the other yoke 124 in alignment with the holes 126 and 128, respectively. A guide 134 is inserted in the guide hole 118 and fixely received in the guide holes 128 and 132. In this position, the holder 54B and cylindrical lens 26B are movable in the direction x. A solenoid 136 having a plunger 138 is securely mounted on the bottom 22a. The tip of the plunger 138 is connected to an arm 140 which extends out from the arm hand 120. A spring 142 is preloaded between the hand 120 and a spring retainer (not shown) which extends from the bottom 22a. Stops 144 and 146 each being implemented by a bolt are received in the threaded stop holes 126 and 130, respectively.

The holder 54B is usually held in abutment against the stop 144 by the force of the spring 142. The stop 144 is adjusted beforehand to allow the cylindrical lens 26B to assume the same position as in the prior art copier 10, whereby copying operations are performed as usual. When the copier is operatively connected to the word processor 12, for example, the solenoid 136 is operated by any desired manipulation. Then, the plunger 138 of the solenoid 136 protrudes against the force of the spring 142 to shift the holder 54B into abutment against the stop 146. Consequently, the cylindrical lens 26B is brought to a position on the optical path downstream of a conventional cylindrical lens, shifting the beam waist away from the photoconductive surface 42. This is successful in achieving the same effect as has been stated in relation to the previous embodiments.

Figure 7:
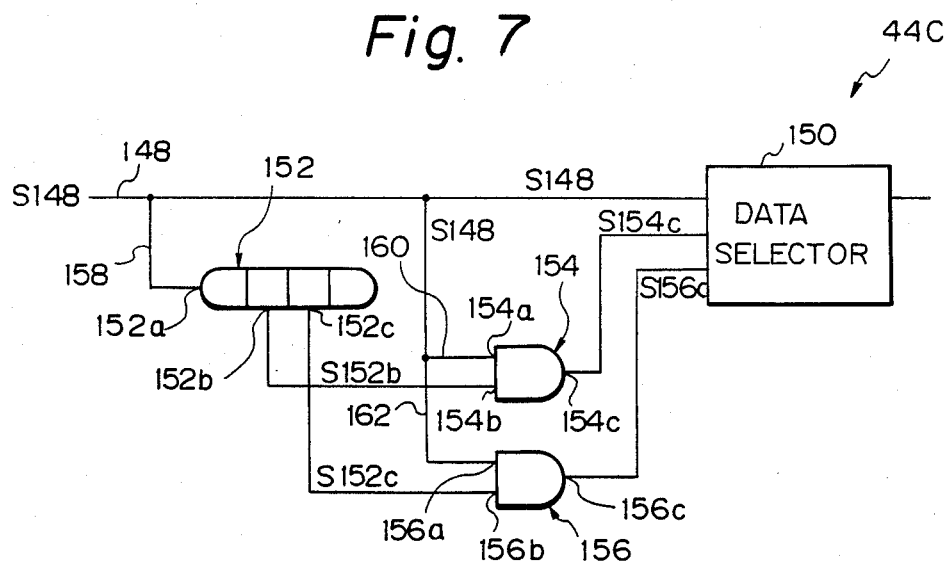
FIG. 7 is a circuit diagram representative of an essential circuit included in still another alternative embodiment of the present invention.
Figure 8:
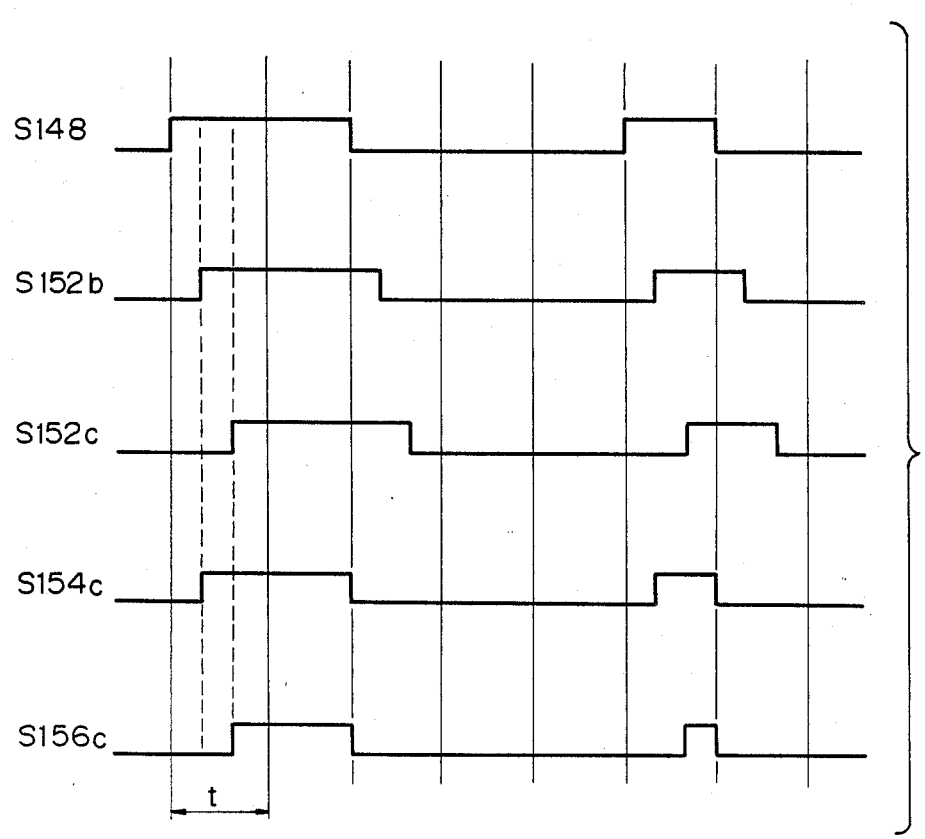
FIG. 8 is a timing chart useful for understanding the operation of the circuit shown in FIG. 7.

Referring to FIGS. 7 and 8, still another alternative embodiment of the present invention is shown. In the figures, the same or similar structrural elements as those shown in FIGS. 1 to 6 are designated by like reference numerals. FIG. 7 shows a switching device 44C installed in the writing section 22 which forms an essential part of the illustrative embodiment. A data selector 150 is provided on a data line 148 which extends from the reading section 16 and inputting section 18 (FIG. 1) to the semiconductor laser 24 which serves as a light source. A delay circuit 152 has one input port 152a and two output ports 152b and 152c. AND gates 154 and 156 have respectively two input ports 154a and 154b and one output port 154c and two input ports 156a and 156b and one output port 156c. Lines 158, 160 and 162 branch off the data line 148. The line 158 is connected to the input port 152a of the delay circuit 152, while the lines 160 and 162 are respectively connected to the input ports 154a and 156a of the AND gates 154 and 156. The output ports 152b and 152c of the delay circuit 152 are connected to the input ports 154b and 156b of the AND gates 154 and 156, respectively. The output ports 154c and 156c of the AND gates 154 and 156 are commonly connected to the data selector 150.

The operation of the switching device 44C will be described with reference also made to FIG. 8. Assuming that the period of time associated with one dot of a signal is t, the delay circuit 152 delays an incoming signal by each ⅓·t. For example, assuming that an image signal 148 shown in FIG. 8 flows through the data line 148, the delay circuit 152 produces signals S152b and S152c as also shown in FIG. 8. The signals S148 and S152b, for example, are applied to the AND gate 154. In response, the AND gate 154 produces AND of the two digital signals, i.e. a composite signal S156c shown in FIG. 8. Likewise, the AN gate 156 produces a composite signal S156c. This kind of operation is generally referred to as a change of duty. It will be seen that the circuit shown and described allows the dot length to be reduced without any spacing being produced between adjacent dots. The signals S148, S154c and S156c having a duty ratio of 3:2:1 are fed to the data selector 150. Usually, the data selector 150 outputs the signal S154c, for example, so that the copier is operated in the same manner as the prior art copier 10. When the copier is operatively connected to the word processor 12, the data selector 150 is actuated by any suitable manipulation to replace the signal S154c with the signal S156c. This increases the illumination time of the laser beam 28 by a period of time associated with one dot. Consequently, the width of pixels in the main scanning direction is increased because the beam spot 40 of the laser beam 28 is sequentially shifted in the main scanning direction. When the signal S148 is selected, the pixels will be reduced in width in the main scanning direction. Hence, it is possible to equalize the interpixel distances in the main and subscanning directions and therefore to uniformize the image density in both of the vertical and horizontal directions.

Figure 9:
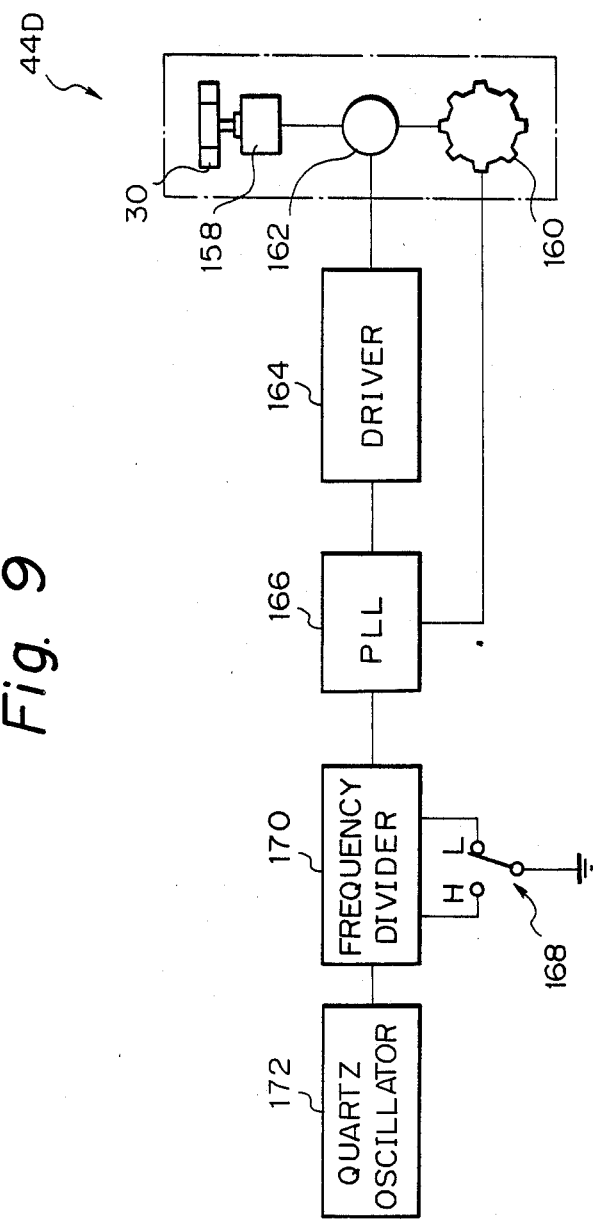
FIG. 9 is a schematic block diagram showing a circuit which forms an essential part of a further embodiment of the present invention.

Referring to FIG. 9, a further alternative embodiment of the present invention is shown. In the figure, the same or similar structural elements as those shown in FIGS. 1 to 8 are designated by like reference numerals. As shown, a switching device 44D of this particular embodiment includes a mirror motor 158 for driving the polygonal mirror 30 and which may be implemented by a brushless motor by way of example. An FG pattern coil 160 is mounted on the mirror motor 158. The motor 158 has a motor coil 162 which is connected to a driver 164. The driver 164 and FG pattern coil 160 are connected to a PLL (Phase-Locked Loop) 166. A quartz oscillator 172 is connected to the PLL 166 via a frequency divider 170 having a switch 168. The switch 168 has contacts H (high speed) and L (low speed).

In the above construction, the switch 168 usually selects the contact H causing the frequency divider 170 to divide the output signal of the quartz oscillator 172 having a predetermined frequency by 20, for example. The FG pattern coil 160 generates a current whose frequency is proportional to the rotation speed of the mirror motor 158. In response to the output of the frequency divider 170 having a predetermined frequency, the PLL 166 controls the output of the driver 164 so as to rotate the mirror motor 158 at, for example, the same speed as with the prior art digital copier 10. At the same time, the PLL 166 constantly senses the rotation speed of the mirror motor 158 on the basis of the output of the FG pattern coil 160 to control the output of the driver 164 in association with its variations. In this condition, the mirror motor 158 is rotated at a constant speed to effect copying operations as usual. When the copier is connected to the word processor 12 for printing out image data, the switch 168 is actuated to select the other contact L. Then, the frequency divider divides the output signal of the quartz oscillator 172 by 10, for example. The resulting signal fed from the frequency divider 170 to the PLL 166 has a frequency which is one half of the frequency associated with the contact H. Hence, the rotation speed of the mirror motor 158, i.e., the rate at which the beam spot 40 scans the photoconductive surface 42 in the main scanning direction is halved. In this instant, since the moving rate of the photoconductive surface 42 in the subscanning direction is constant, the density of scanning lines in the subscanning direction is reduced. This equalizes the interpixel distances in the main and subscanning directions and thereby uniformizes the pixel density in both of the vertical and horizontal directions.

In summary, it will be seen that the present invention provides a digital copier having a switching device installed in a writing section for switching the pixel density over to another pixel density. Hence, one can increase or decrease the diameter and distance of pixels in both of the main and subscanning directions by a simple manipulation, thereby changing the printing pixel density which dictates the image quality. It follows that the copier achieves a wide variety of applications, i.e., it adapts itself even to image data which are outputted by another kind of machine.

Various modifications will become possible for those skilled in the art after receiving the teachings of the present disclosure without departing from the scope thereof. For example, in any of the embodiments shown and described, the image quality may be further enhanced by switching the rotation speed of the polygonal mirror 22 to correct the magnification of an image, by changing the illumination time per dot to correct the interpixel distance in the main scanning direction, by effecting optical switchover to correct the interpixel distance in the subscanning direction, etc.

What is claimed is:

1. A digital copier capable of printing out image data which are outputted by another machine connected to said copier, comprising:
   a reading section for optically reading a document to be copied and outputting the read document in the form of first image data;
   an inputting section for receiving and outputting second image data which are fed from said another machine;
   a writing section for writing a series of images of one of said first and said second image data, sad writing section comprising a light source, illuminating optics for causing light to substantially converge on an optical axis of said light source, a rotatable polygonal mirror located downstream of an optical path of said illuminating optics, reflecting optics for converging in the form of a beam spot the light which is reflected by said polygonal mirror for scanning, and an imaging surface on which said light spot is scanned relative to said imaging surface and focused in the form of a pixel; and
   switching means installed in said writing section, responsive to one of said first and second image data, for switching a pixel density for a series of images to one of a plurality of pixel densities selected so that said selected reading section first image data and said inputting section second image data, wherein said illuminating optics comprises a plurality of lenses each having a different focal length, said switching means being constructed to select one of said lenses, and wherein said switching means comprises holder means loaded with at least two of said lenses which are individually positioned on independent optical axes which extend along said optical axis of said illuminating optics, said lenses being individually adjustable in position on said holder means, holder driving means for driving said holder means in a direction perpendicular to said optical axis, and positioning means for selectively stopping said holder means at a predetermined position where an optical axis of one of said two lenses coincides with said optical axis of said illuminating optics and a predetermined position where an optical axis of the other lens coincides with said optical axis.

2. A digital copier as claimed in claim 1, wherein said holder driving means comprises a reversible motor, a spiral rod connected to said reversible motor to be rotated in a rotary motion, and a spiral hole formed through said holder means and with which said spiral rod is held in threaded engagement.

3. A digital copier as claimed in claim 1, wherein said holder driving means comprises solenoid means, an arm member operatively connected to said solenoid means to be moved in an angular motion, and a hand member securely connected to holder means for transmitting an angular movement of said arm member to said holder means.

4. A digital copier capable of printing out image data which are outputted by another machine connected to said copier, comprising:
   a reading section for optically reading a document to be copied and outputting the read document in the form of first image data;
   an inputting section for receiving and outputting second image data which are fed from said another machine;
   a writing section for writing a series of images of one of said first and said second image data, sad writing section comprising a light source, illuminating optics for causing light to substantially converge on an optical axis of said light source, a rotatable polygonal mirror located downstream of an optical path of said illuminating optics, reflecting optics for converging in the form of a beam spot the light which is reflected by said polygonal mirror for scanning, and an imaging surface on which said light spot is scanned relative to said imaging surface and focused in the form of a pixel; and
   switching means installed in said writing section, responsive to one of said first and second image data, for switching a pixel density for a series of images to one of a plurality of pixel densities selected so that said selected reading section first image data and said inputting section second image data, wherein said illuminating optics comprises a single lens provided on said optical axis of said illuminating optics, said switching means being constructed to selectively move said lens to any one of a plurality of predetermined stop positions, and wherein said switching means comprises holder means carrying said lens with an optical axis of said lens coinciding with said optical axis of said illuminating optics, holder driving means for shifting said holder means along said optical axis and positioning means for moving said holder means to any of the plurality of stop positions.

5. A digital copier as claimed in claim 4, wherein said holder driving means comprises solenoid means, an arm member connected to said solenoid means to be moved along said optical axis, and a hand member securely connected to said holder means for transmitting a movement of said arm member to said holder means.

* * * * *